United States Patent Office 2,890,211
Patented June 9, 1959

2,890,211

MANUFACTURE OF POLYVINYL CHLORIDE RESIN

Donald E. Lintala, Akron, Ohio, assignor to Wingfoot Corporation, Akron, Ohio, a corporation of Delaware No Drawing. Application June 19, 1953
Serial No. 362,960

4 Claims. (Cl. 260—92.8)

This invention relates to the manufacture of a polyvinyl chloride resin and more particularly to the manufacture of a polyvinyl chloride resin having a particle size in a range which permits the formation of a plastisol having a relatively low and stable initial viscosity and a relatively long shelf life.

It has been observed that a polyvinyl chloride resin useful for plastisol and organosol applications should have a particle size in general no larger than 2 microns and preferably should have an average particle size in the range of from about 0.5 to about 2 microns. When a polyvinyl chloride resin is prepared in accordance with well-known emulsion polymerization techniques, the resulting polyvinyl chloride resin particles are of exceedingly small size, generally in the range below 0.1 micron. On the other hand, when a vinyl chloride resin is prepared in accordance with well-known suspension techniques involving the use of a dispersing agent, the resulting polyvinyl chloride resin particles can range in size up to 500 microns.

Resin particles ranging in size from about ½ to about 2 microns have reportedly been made by the emulsion polymerization technique when the polyvinyl chloride monomer is polymerized in the presence of polyvinyl chloride seeds. It is of particular interest, however, to note that polyvinyl chloride resin produced in accordance with this "seeding" method and having a particle size in the desired range does not produce a plastisol which has as low an initial viscosity nor as long a shelf life as does a plastisol made from the resin of this invention. For example, plastisols produced from resins made in accordance with the present invention have an initial viscosity of about 2500 cps. (Brookfield), whereas a plastisol made from a polyvinyl chloride resin produced according to the "seeding" technique has an initial viscosity of from 8000 to 14,500 cps. (Brookfield). A plastisol made with the present invention has a shelf life ratio of 2 after two weeks, or a viscosity of 5000, whereas a plastisol made from a resin made according to the "seeding" technique will have a shelf life ratio of anywhere from 4 to 8 after two weeks, or a viscosity of from 58,000 to 64,000.

Thus, it can be seen that neither the emulsion resin nor the suspension resin of the above description lends itself to the formation of plastisols or organosols because the resulting plastisols or organosols do not possess the rheological properties that are desirable and necessary in making a plastisol or organosol having a relatively low initial viscosity and a relatively long shelf life stability.

It has now been discovered that a polyvinyl chloride resin having an average particle size in the range from about 0.5 to about 2 microns can be made in a facile, efficient and economical manner by an homogenization technique which is carried out prior to the polymerization of the vinyl chloride monomer. More specifically, the liquid vinyl chloride monomer is reduced to individual units, quantities, or spheres having a diameter size of from about 0.5 to about 2 microns in the presence of a dispersing medium, as, for example, water, which is present in a ratio of dispersing medium to dispersed phase of about 2 to 1.

More particularly, the present invention is described with regard to the manufacture of polyvinyl chloride in which 100 parts of liquid vinyl chloride monomer to which has been added 1 part of a monomer soluble organic peroxide catalyst, are homogenized in an aqueous phase comprising a water solution of a protective colloid. The protective colloid solution is made up by adding 5 parts of gelatin and 2 parts of trisodium phosphate to 400 parts of water and homogenizing 200 parts of this mixture with the 100 parts of liquid vinyl chloride monomer, containing the catalyst, in a suitable homogenizer.

Specifically, the vinyl chloride monomer may be broken up into particle sizes ranging from about 0.5 to 2 microns with an homogenizer and particularly a two-stage Gaulin homogenizer, Model 75–E, in which the first pressure stage may be set at a pressure in the range from about 2,500 to about 3,500 pounds per sq. in. and in which the second pressure stage may be set at a pressure ranging between about 2,000 to about 2,500 pounds per sq. in. The mixture of vinyl chloride monomer and water containing the protective colloid may be passed through this homogenizer once and then the homogenized dispersion may be passed into a reactor to which has been added the remaining 207 parts of the water solution of protective colloid and the entire batch agitated with a conventional impeller type agitator. The polymerization of the vinyl chloride is then carried out under conventional heating conditions to produce a polyvinyl chloride resin having an average particle size in the range from about 0.5 to about 2 microns.

Any suitable protective colloid agent may be used. It is preferred to employ about 5 parts of gelatin of the high gel strength type (275 Bloom) exhibiting an isoelectric point between pH 7 to 9. It has been observed that oversize particles of polyvinyl chloride resin are obtained when attempts are made to significantly reduce the use of gelatin below 5 parts per 100 parts of vinyl chloride monomer.

Any suitable buffer may be used in maintaining the pH above the isoelectric point of the gelatin. Trisodium phosphate is used for this purpose.

Any suitable catalyst used to promote the polymerization of vinyl chloride may be used. Organic peroxides such as benzoyl, lauroyl, or 2,4-dichloro benzoyl peroxide, all of which are soluble in vinyl cholride, may be used to catalyze the polymerization. The catalyst may be used in concentrations of from about .05 to 1.0 part per 100 parts of vinyl chloride monomer. The temperature of polymerization is established by the desired molecular weight of the polymer and temperatures are generally used which fall in the range between about 90° F. to about 120° F. A vinyl chloride resin was made by homogenizing 100 parts of liquid vinyl chloride monomer in the presence of 1 part of lauroyl peroxide and 200 parts of a water solution of protective colloid taken from 407 parts of protective colloid made from 400 parts of water, 2 parts of trisodium phosphate and 5 parts of gelatin having a gel strength of 275 Bloom and exhibiting an isoelectric point of about pH 8. The homogenization was effected through a two-stage Gaulin homogenizer, Model 75–E, in which the pressure in the first stage was set at 3,000 pounds per sq. in. and the pressure in the second stage was set at 2,500 pounds per sq. in. After a single pass of this mixture through the homogenizer, the homogenized mixture, together with the remainder, or 207 parts of the water solution of protective colloid, was reacted at 118° F. for 13 hours. After the polymerization was completed, the resulting resin was dewatered and washed and then dried.

The resulting dried resin had an average particle size of approximately 2 microns. One hundred parts of this resin was mixed with 60 parts of dioctyl phthalate to form a plastisol composition which had an initial viscosity of 2,500 (Brookfield cps.), and a shelf life stability of 2 which is the ratio of the plastisol viscosity after two weeks ageing to the initial viscosity.

It has been found that it is desirable and advantageous to maintain a water to vinyl chloride monomer ratio of about 2 to 1 during homogenization. When a lesser proportion of water is used, there is a tendency to produce oversize resin particles.

The invention has been described with regard to the manufacture of polyvinyl chloride. However, copolymers in which more than 50% of vinyl chloride is present, may also be made in accordance with the present invention. Thus, vinyl chloride copolymers with dialkyl maleates, particularly dimethyl and diethyl maleate, and dialkyl fumarates, particularly dimethyl and diethyl fumarates, may be polymerized to the desired average particle size ranging from about 0.5 to about 2 microns.

In practicing the present invention it has been observed that the average size of the resin particles are made up of a large percentage of particles having a particle size of from about 0.5 to 2 microns. When the average particle size of the resin particles is made up of a mixture containing a large percentage of particle sizes below 0.5 micron, the initial viscosities of below 5000 are not obtainable and shelf life ratios below 3 are not realized. When a large percentage of the particles have a size above 2 microns a plastisol of the resin is grainy and does not lend itself readily to knife coating operations. It is important, therefore, that the resulting resin particles are predominantly of a size in the range of from about 0.5 to 2 microns, rather than in a range below 0.5 or above 2 microns.

The method of homogenization as described in the present invention insures this production of resin particles which are all nearly of a size falling in the range of from 0.5 to about 2 microns.

When the average particle size is made up of particles within the range of 0.5 to 2 microns, plastisol compositions exhibit initial viscosities ranging from 2500 to 15,000, depending upon the particle size distribution, and shelf life ratios after two weeks of not more than about 2. Without the advantage of the present invention the ratio is much higher than 2 and may also occur over a much shorter period of time.

While certain representative embodiments and details have been shown for the purpose of illustrating the invention, it will be apparent to those skilled in this art that various changes and modifications may be made therein without departing from the spirit or scope of the invention.

I claim:

1. A process for the preparation of a plastisol grade of a vinyl chloride resin which comprises subjecting liquid vinyl chloride monomer to homogenization in order to presize the monomer into droplets having a diameter size ranging from about 0.5 to about 2 microns, maintaining the monomer in said droplet sizes by means of gelatin having an isoelectric point of about pH 7 to and including pH 9 while thereafter passing the presized monomer droplets into a reaction vessel wherein polymerization of the monomer droplets takes place in an emulsion free aqueous dispersion in the presence of a polymerization catalyst for the vinyl chloride monomer and soluble in said monomer until said monomer has been converted to corresponding vinyl chloride resin particles.

2. A process for the preparation of a plastisol grade of a vinyl chloride resin which comprises subjecting liquid vinyl chloride monomer to homogenization in order to presize the monomer into droplets having a diameter size ranging from about 0.5 to about 2 microns, maintaining the monomer in said droplet sizes by means of gelatin having an isoelectric point of about pH 7 to and including pH 9 while thereafter passing the presized monomer droplets into a reaction vessel wherein polymerization of the monomer droplets takes place in an emulsion free aqueous dispersion in the presence of a polymerization catalyst for the vinyl chloride monomer and soluble in said monomer until said monomer has been converted to corresponding vinyl chloride resin particles, the gelatin being used in an amount of about 5 parts per 100 parts of monomer.

3. A process for the preparation of a plastisol grade of a vinyl chloride resin which comprises subjecting liquid vinyl chloride monomer to homogenization in the presence of an emulsion free aqueous medium containing gelatin having an isoelectric point of about pH 7 to and including pH 9 until vinyl chloride monomer droplets are formed having a diameter size ranging from about 0.5 to about 2 microns, thereafter passing the droplets into a reaction vessel wherein polymerization of the monomer droplets takes place in said emulsion free medium in the presence of a polymerization catalyst for the vinyl chloride monomer and soluble therein and recovering the resulting vinyl chloride resin particles, the gelatin being used in an amount of about 5 parts per 100 parts of monomer.

4. A process for the preparation of a plastisol grade of a vinyl chloride resin which comprises subjecting liquid vinyl chloride monomer to homogenization in order to presize the monomer into droplets having a diameter size ranging from about 0.5 to about 2 microns, maintaining the monomer in said droplet sizes by means of gelatin having an isoelectric point of about pH 7 to and including pH 9 while thereafter passing the presized monomer droplets into a reaction vessel wherein polymerization of the monomer droplets takes place in an emulsion free aqueous dispersion in the presence of a polymerization catalyst for the vinyl chloride monomer and soluble in said monomer until said monomer has been converted to corresponding vinyl chloride resin particles, the gelatin being used in an amount of about 5 parts per 100 parts of monomer, the aqueous dispersion containing 2 parts of water to 1 part of monomer.

References Cited in the file of this patent

UNITED STATES PATENTS

| | | |
|---|---|---|
| 1,789,873 | Lescher et al. | Jan. 20, 1931 |
| 2,427,513 | Spessard | Sept. 16, 1947 |
| 2,689,836 | Bier | Sept. 21, 1954 |

FOREIGN PATENTS

| | | |
|---|---|---|
| 685,838 | Great Britain | Jan. 14, 1953 |